United States Patent [19]

Johannessen

[11] Patent Number: 5,303,782
[45] Date of Patent: Apr. 19, 1994

[54] FLOW CONTROLLING DEVICE FOR A DISCHARGE SYSTEM SUCH AS A DRAINAGE SYSTEM

[76] Inventor: Jørgen M. Johannessen, 6 Aspevej, Strøby Egede, DK-4600 Koge, Denmark

[21] Appl. No.: 988,915
[22] PCT Filed: Sep. 10, 1991
[86] PCT No.: PCT/DK91/00261
    § 371 Date: Mar. 9, 1993
    § 102(e) Date: Mar. 9, 1993
[87] PCT Pub. No.: WO92/04667
    PCT Pub. Date: Mar. 19, 1992

[30] Foreign Application Priority Data

Sep. 11, 1990 [DK] Denmark .............................. 2169/90
Jan. 15, 1991 [DK] Denmark .............................. 0072/91

[51] Int. Cl.$^5$ ................................................ F15C 1/16
[52] U.S. Cl. ..................................... 137/809; 137/811; 137/813
[58] Field of Search ............... 137/808, 809, 810, 813, 137/811, 812

[56] References Cited

U.S. PATENT DOCUMENTS

| 3,207,168 | 9/1965 | Warren . | |
| 3,323,550 | 6/1967 | Lee, II | 137/809 |
| 3,461,897 | 8/1969 | Kwok | 137/809 |
| 3,513,865 | 5/1970 | Van Der Heyden | 137/813 |
| 4,679,595 | 7/1987 | Johannessen | 137/813 |
| 5,076,327 | 12/1991 | Mettner | 137/809 |

FOREIGN PATENT DOCUMENTS

| 135904 | 7/1977 | Denmark . | |
| 795120 | 1/1990 | Denmark . | |
| 41141 | 4/1969 | Finland . | |
| 2583118 | 6/1985 | France . | |
| 8707048 | 11/1987 | PCT Int'l Appl. . | |
| 8908750 | 9/1989 | PCT Int'l Appl. . | |
| 2210995 | 6/1989 | United Kingdom | 137/808 |

*Primary Examiner*—A. Michael Chambers
*Attorney, Agent, or Firm*—Browdy and Neimark

[57] ABSTRACT

The invention is directed to a flow controlling device for a discharge system, such as a drainage system, having a first vortex chamber with an inlet and an outlet and a second bigger vortex chamber with a peripheral inlet and a central outlet axial in relation to a vortex in the second chamber. The second vortex chamber is connected at its inlet to the outlet of the first vortex chamber. The first vortex chamber is symmetrical with respect to a median plane perpendicular to a vortex axis (A), the direction of both the inlet and the outlet of this chamber being parallel with the median plane. The first vortex chamber is asymmetric with respect to a plane parallel with the inlet direction and perpendicular to the median plane. The vortex axis (A) of the first vortex chamber being perpendicular to a tangent of the second vortex chamber at the peripheral inlet and the ratio between the diameters of the first vortex chamber and the second vortex chamber is less than 0.43:1.

8 Claims, 4 Drawing Sheets

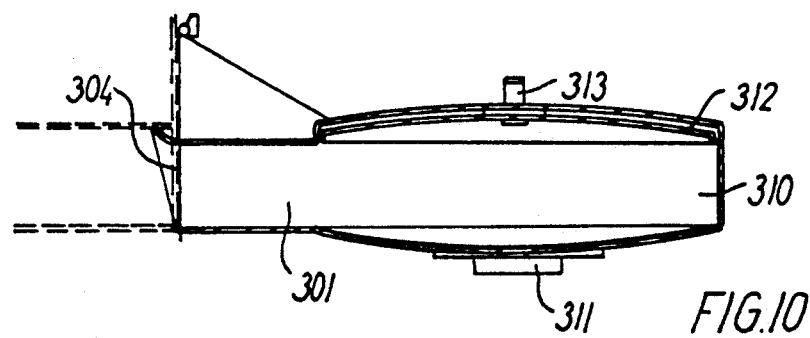
FIG. 10
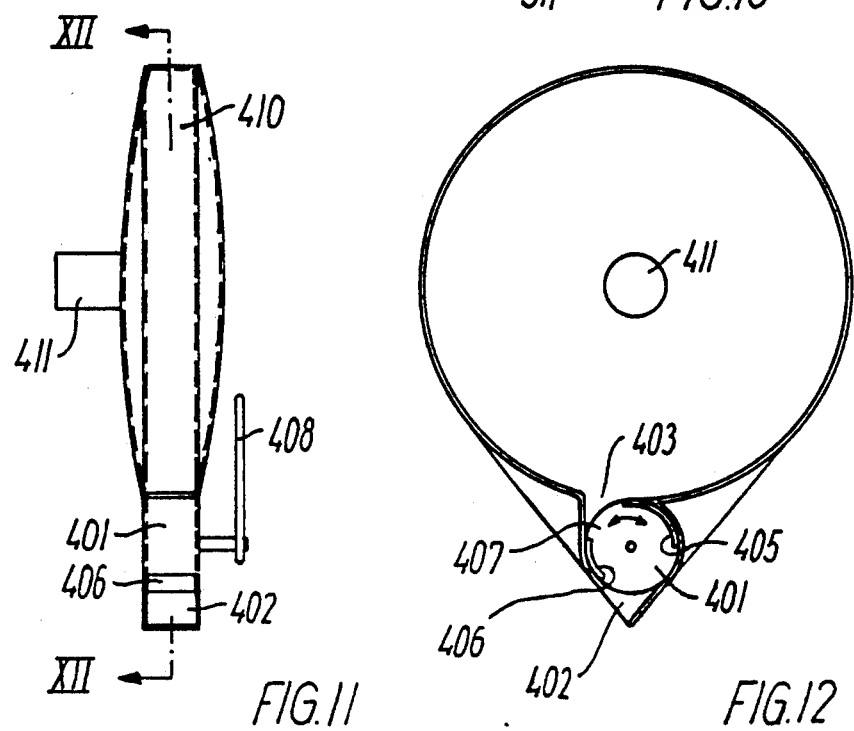
FIG. 11
FIG. 12
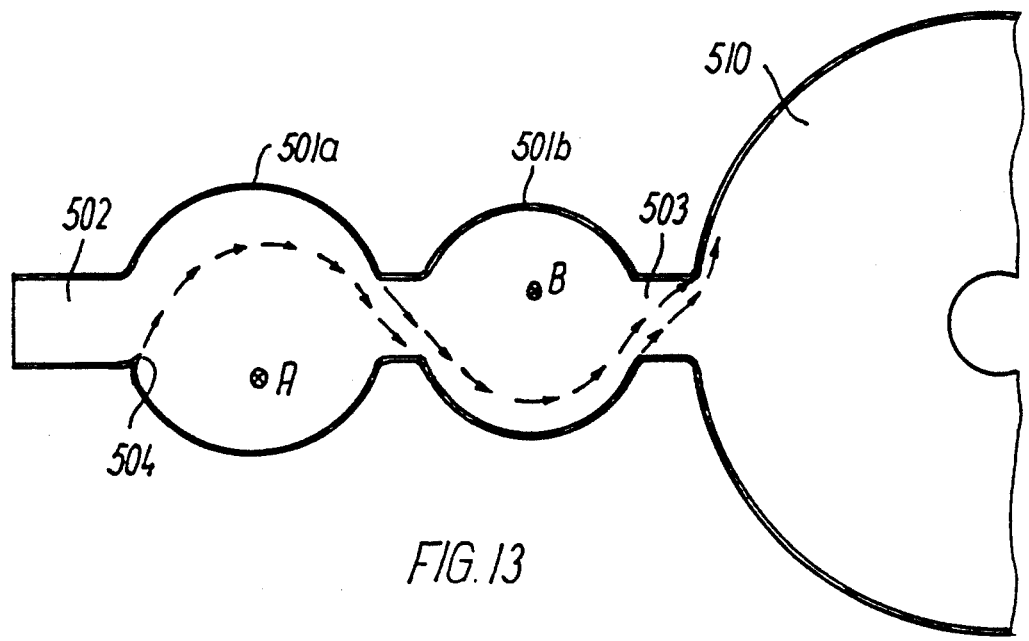
FIG. 13

FLOW CONTROLLING DEVICE FOR A DISCHARGE SYSTEM SUCH AS A DRAINAGE SYSTEM

BACKGROUND OF THE INVENTION

1. Field of the Invention

The present invention relates to a flow controlling device for a discharge system, such as a drainage system, comprising a first vortex chamber with an inlet and an outlet and a second bigger vortex chamber with a peripheral inlet and a central outlet axial in relation to a vortex in this chamber, said second vortex chamber being at its inlet connected to the outlet of the first vortex chamber.

2. Prior Art

Such a flow controlling device is known from the accepted SE specification no. 457,121 and the corresponding WO-A-87/07048. Other flow controlling devices are known from the accepted DK specification no. 135,904, published GB specification no. 2,141,561 and U.S. Pat. Nos. 4,206,783 and 4,679,595. From these publications it is known to brake the flow of a liquid by leading it tangentially into a housing with an essentially circular cross section and which forms a vortex chamber. Common for these devices are that it is a prerequisite for the information of vortices and consequently for the establishing of the braking or controlling effect that the inlet flow into the vortex chamber takes place essentially perpendicular to the outlet flow dependent on the construction of the vortex chamber.

Within the field of controlling the flow of liquids and in particular within the environment sector there is an increasing need for not only a possibility to change the capacity by adjusting a controlling device but to an even higher degree a need for a possibility to control even smaller liquid flows than usual by means of a controlling device with a favourable characteristic and an acceptable cross section of the flow, clogging on account of solid or viscous impurieties in the liquid being thus avoided.

OBJECT OF THE INVENTION

The object of the invention is thus to provide a flow controlling device, which in comparison with the known controlling devices has a bigger braking effect in relation to the cross section of the flow.

Furthermore, it is an object of the invention to provide a flow controlling device, which makes it possible for the inlet and the outlet to have essentially the same direction or to be placed in series.

SUMMARY OF THE INVENTION

To meet these objects the flow controlling device differs from the known ones in that the first vortex chamber is symmetrical with respect to a median plane perpendicular to the vortex axis (A), that the direction of both the inlet and the outlet is parallel with this plane, that the first vortex chamber with inlet and outlet is asymmetric with respect to a plane parallel with the inlet direction and perpendicular to said median plane, that the vortex axis (A) of the first vortex chamber is perpendicular to the tangent of the second vortex chamber at the inlet and that the ratio between the diameters of the first vortex chamber and the second vortex chamber is less than 0.43:1. Thereby it is achieved that the jet of liquid running into the first vortex chamber, on account of a vortex created due to the asymmetry in this chamber, will be contracted and accelerate and flow diagonally out through the outlet of this first vortex chamber. The jet thus flows essentially tangentially into the second vortex chamber at great velocity and with a very small cross section in relation to the inlet opening, this second chamber getting thereby a high braking effect in relation to the cross section of the flow passage.

According to an embodiment of the invention the first vortex chamber is an essentially disc-shaped hollow space, the inlet and outlet of which are essentially positioned on a common axis, and in which in the inlet at one side of a plane through the inlet and the outlet and perpendicular to the plane of the disc a protrusion is provided. By this embodiment it is achieved that a strong flow of liquid in the inlet to the first vortex chamber is influenced by a considerable deflection power, which is essentially enhanced by a vortex created behind the protrusion and which forces the flow of liquid towards the periphery of the chamber opposite to the protrusion and the vortex, the flow being contracted and accelerated. A small flow will only be subjected to a small deflection power. Several, first vortex chambers of this construction may be placed in series for successive creation of bigger vortices.

According to another embodiment the first vortex chamber is an essentially disc-shaped hollow space, and the inlet of this vortex chamber is essentially tangential.

The first vortex chamber may have an inner and an outer peripheral wall, the inner peripheral wall being adapted to be displaced in such a way along the outer peripheral wall that the size of the opening of the inlet and/or the outlet can be changed. Thereby it is made possible to change the characteristic of the controlling device.

In a another embodiment the inlet of the first vortex chamber comprises a stub, which is adapted to extend into a hollow space, from which liquid during operation flows into the flow controlling device. Thereby a contraction of the in-flowing jet of liquid is achieved already at the inlet and consequently a stronger effect.

According to a further embodiment of the invention a slide valve is provided in the flow path between the first and the second vortex chamber, said slide valve being activated by a spring towards an open position and towards a closed position by a member, which is in turn activated by a displaceable wall in a chamber, which is flow-connected with the second vortex chamber close to its periphery. There a throttling is attained between the first and the second vortex chamber depending on the biggest pressure in the second vortex chamber. In case of clogging of the slide valve, the pressure at the periphery of the second vortex chamber will decrease, the slide valve will open and the clogging be let through the controlling device.

According to a further embodiment of the invention, in which the second vortex chamber is essentially circular and disc-shaped and positioned in such a way that the disc-shape is horizontal, a circular disc is provided on the innerside of the upper side wall of the second vortex chamber, which disc with a small interspace follows said side wall and at its centre is suspended for horizontal rotation and by means of a spring activated upwards to brake against said rotation. Thereby it is achieved that above the disc an air space is enclosed, when the second vortex chamber is full, and that the pressure in this airspace is increased, when the pressure in the liquid at the periphery of the vortex chamber is increased, the disc being forced downwards against the spring in such a way, that the disc is allowed to rotate when the controlling device is heavily loaded, which reduced the resistance against rotation of the liquid in the second vortex chamber, the braking effect of this chamber on the flow of liquid being improved at increased pressure.

BRIEF DESCRIPTION OF THE DRAWINGS

The invention will be described in detail in the following by means of embodiments with reference to the accompanying drawing, in which.

DETAILED DESCRIPTION OF THE PREFERRED EMBODIMENT

Figure 1:
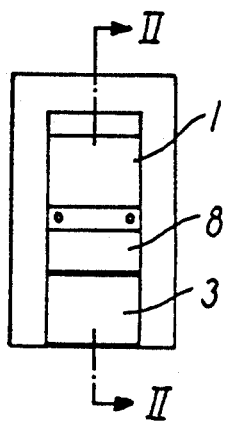
FIG. 1 shows a flow controlling device according to the invention comprising a first vortex chamber, FIG. 2 a sectional view along the line II—II of FIG. 1, FIG. 3 a second embodiment, which as the embodiment according to FIGS. 1 and 2 comprises a first vortex chamber, FIG. 4 a sectional view along the line IV—IV of FIG. 3, FIG. 5 a third embodiment of a flow controlling device according to the invention comprising a first vortex chamber and a conical, second vortex chamber seen from the inlet end, FIG. 6 the flow controlling device according to FIG. 5 seen from above, FIG. 7 a fourth embodiment of a flow controlling device seen from the side, FIG. 8 a horizontal, sectional view of the flow controlling device according to FIG. 7 seen from above, FIG. 9 a sectional view along the line IX—IX according to FIG. 8, FIG. 10 a vertical, sectional view of another embodiment of the flow controlling device seen from the side, FIG. 11 a further flow controlling device according to the invention seen from the front in relation to the inlet opening, FIG. 12 a sectional view along the line XII—XII according to FIG. 11, and FIG. 13 a horizontal, sectional view of another embodiment of the invention seen from above.
Figure 2:
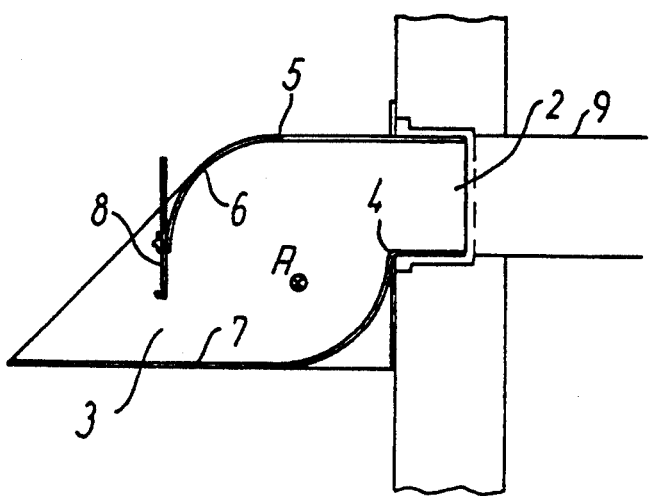

The first embodiment of the invention shown in FIGS. 1 and 2 comprises a single first vortex chamber 1 with an inlet 2 and an outlet 3. As will be seen in the drawing the flow path from the inlet 2 to the outlet 3 is S-shaped, said path being essentially followed by a liquid with small currents. In case of bigger currents a vortex with an axis A will, however, be formed behind an edge 4 at the inlet 2. This vortex will increase with increasing flow and thereby create an increasing resistance towards said flow, as the flow of liquid entering in order to pass the vortex have to be contracted against a side wall 5 and at the same time accelerated, energy being thus consumed. The contracted jet of liquid then follows the wall 5 through the curvature 6, after which it is deflected by the other side wall 7 towards the outlet 3, a considerable backwards pressure being created at the outer side of the jet of liquid. These factors increase the resistance in the flow controlling device. As will be seen from the drawing the inlet and the outlet are positioned in the same direction but are displaced in relation to one another. This displacement results in the embodiment shown in a difference of height between the inlet and the outlet. This difference of height may be changed by turning the flow controlling device around the axis of the inlet. Thereby the characteristic of the flow controlling device is changed. This characteristic may be further adjusted, if the side wall 5 at the outlet 3 comprises a wedge 8, which can be displaced upwards and downwards as seen in FIG. 2 in order to adjust the size of the outlet opening.

Figure 3:
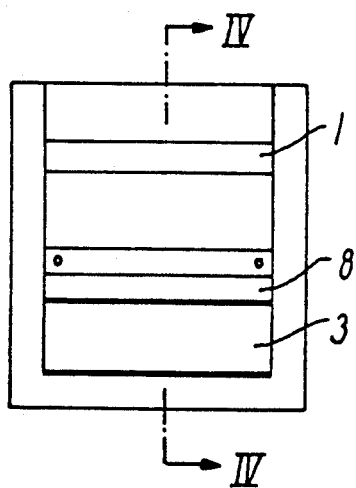
Figure 4:
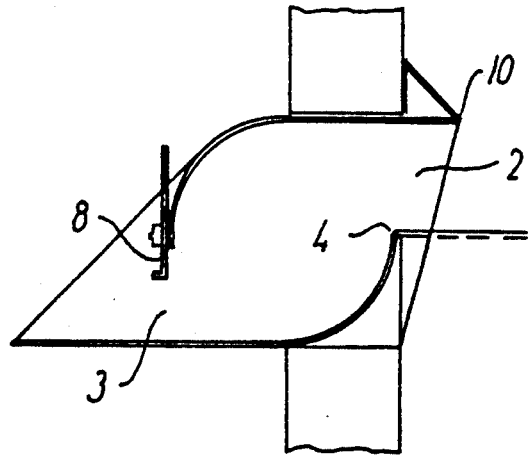

The flow controlling device according to FIGS. 1 and 2 has a circular inlet 2 and is, as indicated in FIG. 2, adapted to be connected with a pipe 9. In FIGS. 3 and 4 another embodiment of the flow controlling device is shown, said embodiment comprising a single first vortex chamber 1 and being essentially similar to the embodiment shown in FIGS. 1 and 2. This second embodiment is, however, adapted at its inlet 2 to be connected with a well as indicated in FIG. 4. The inlet is in this case provided with an edge 10 extending into the well. As shown in FIG. 4 the flow controlling device will drain off water from the well, if the liquid level raises above the level of the edge 4. In case of a considerable increase in the level of the liquid in the well up over the edge 10, a considerable contraction of the inlet jet will result as indicated in the figure, because liquid will flow from all sides and in particular from below, where there is no protrusion towards the flow path, which makes the flow controlling device more effective.

Figure 5:
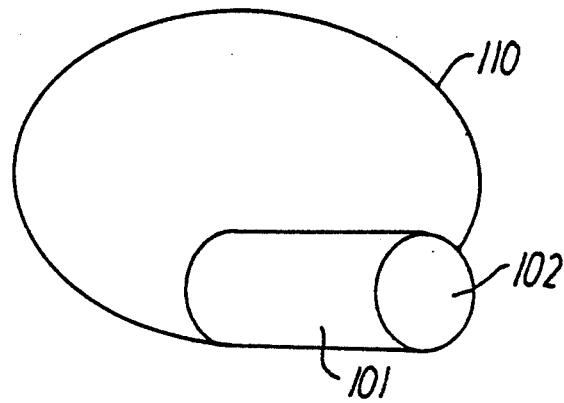
Figure 6:
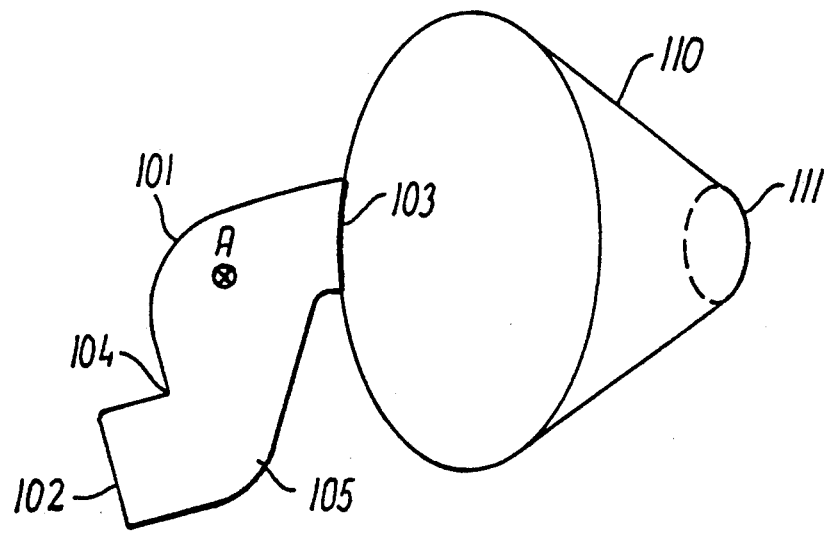

The third embodiment shown in FIGS. 5 and 6 of the flow controlling device comprises a first vortex chamber 101 of disc-shape and a second vortex chamber 110 with the shape of a right cone. The first vortex chamber 101 has an inlet 102 and an outlet 103, which is connected to the inlet of the second vortex chamber 110. This vortex chamber has an outlet 111 at the vertex of the cone. In the first vortex chamber 101 a side wall 105 and an edge 104 is provided in the vortex chamber at the side of the inlet 102, which is opposite to the side wall 105.

Like in the preceding embodiments a small flow of liquid will flow essentially straight and unimpededly through the flow controlling device in an S-shaped path from the inlet 102 to the outlet 111. By increasing flow of liquid a vortex will form around an axis A in the first vortex chamber behind the edge 104. This vortex will force the inlet jet of liquid against the side wall 105, this jet being then contracted and accelerated like in the first embodiment. From the vortex chamber 101 the flow of liquid is exposed to an opposite turning in relation to the deflection after the inlet 102 and is then straightened out through the outlet 103, a further contraction and acceleration of the flow of liquid resulting. The result of the acceleration and the contraction and of the flow of liquid being conducted around along the side wall 105 is that the jet of liquid, flowing through the outlet 103 from the first vortex chamber and into the second vortex chamber, will flow at great velocity with an essentially tangential component in relation to the second vortex chamber. This creates a vortex in the second vortex chamber, which will then function in the same way as if it had a proper tangential inlet like the ones commonly used.

Figure 7:
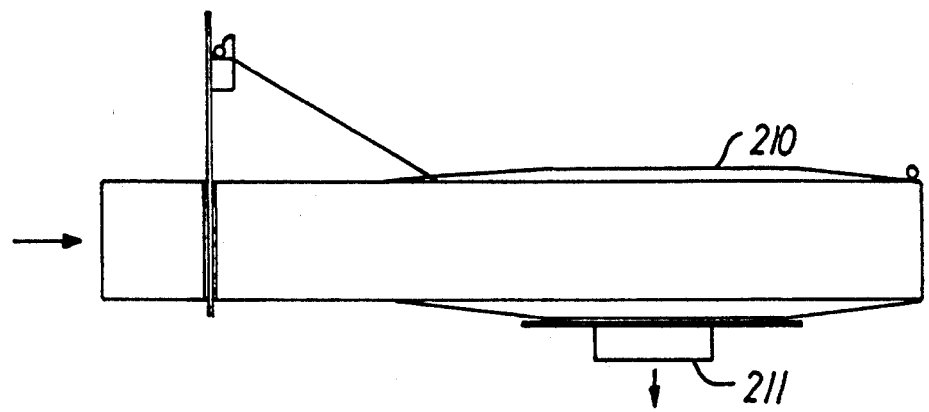
Figure 8:
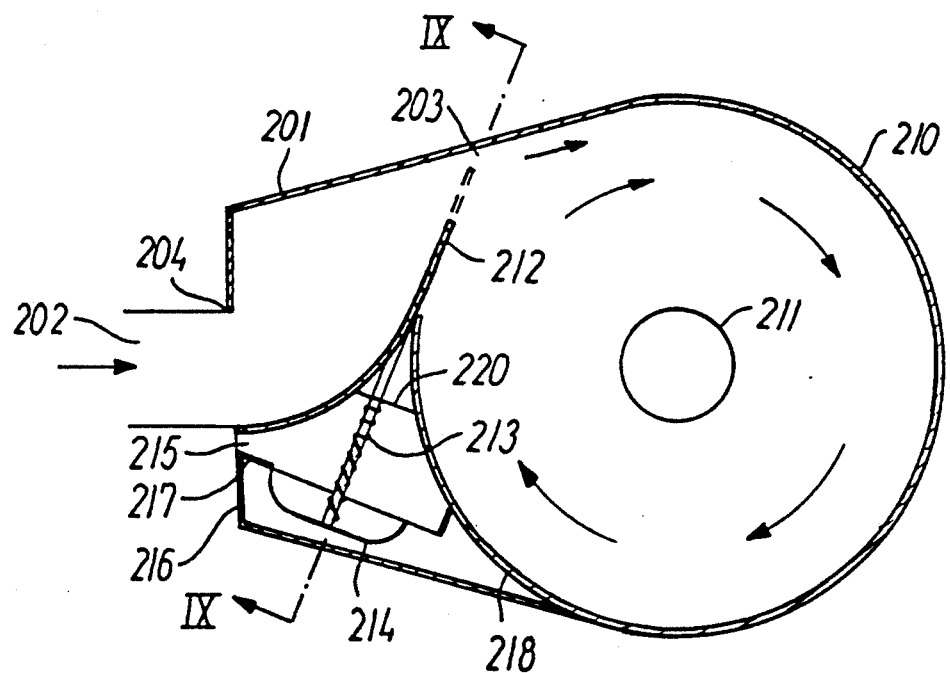
Figure 9:
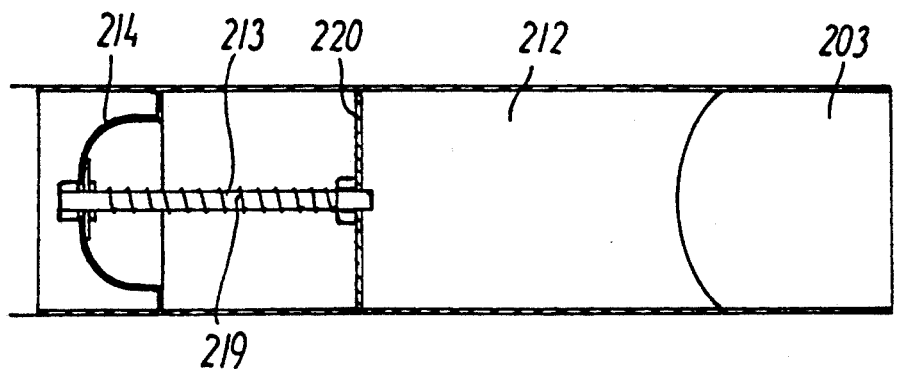

The fourth embodiment of the flow controlling device shown in FIGS. 7-9 has, like in the third embodiment, a disc-shaped first vortex chamber 201 with an inlet 202 and an outlet 203. The succeeding, second vortex chamber 210 is in this case circular and disc-shaped with an outlet 211 at the centre of the disc-shape. Like in the preceding embodiment a vortex will arise around an axis A behind an edge 204 in the inlet of the first vortex chamber 201, said vortex forcing a big, in-flowing amount of liquid to flow around in the vortex chamber 201, from where a contracted, strongly accelerated flow of liquid moves tangentially into the second vortex chamber 210, whereby a strong vortex is created in this chamber. This results in big centrifugal forces in the second vortex chamber 210, which brake the flow of liquid.

This embodiment further comprises, as will be seen in FIGS. 7 and 8, a throttling in the shape of an automatic mechanism for controlling the size of the opening of the outlet 203 of the first vortex chamber, i.e. the inlet to the second vortex chamber 210. The mechanism comprises a displaceable plate 212, which in the plane of FIG. 7 is displaceable in its longitudinal direction. This plate 212 is connected with rod 213, which is in turn connected with a resilient membrane 214. Between the two vortex chambers 201 and 210 two chambers 215 and 216, respectively, are provided. These two chambers are divided by means of a rigid wall 217, in which the membrane 214 is inserted in an opening. The chamber 215 is flow-connected with the surroundings in such a way that in this chamber there will be atmospheric pressure, while the chamber 216 is flow-connected to the second vortex chamber 210 at its periphery at a place marked 218. There will thus in the chamber 216 be the same pressure as at the periphery of the second vortex chamber 210, i.e. at the place in the vortex chamber, where the pressure is highest. The rod 215 and consequently the plate 212 is by means of a spring 219, which rests against a supporting wall 220, activated in order to open the outlet 203. In FIG. 9, and with full-drawn line in FIG. 8, the inlet 203 is shown fully opened with the plate 212, the rod 213 and the membrane 214 in corresponding positions. In case of a big flow of liquid and a high pressure in the inlet 202, a big pressure at the periphery of the second vortex chamber 210 will arise and subsequently a considerable braking effect will be attained. The big pressure at the periphery of the second vortex chamber will in the chamber 216 influence the membrane 214, whereby the membrane, the rod 213 and the plate 212 will be pressed forwards against the force of the spring 219. Thereby the opening of the outlet 203 will become smaller, which results in an increased braking effect of the controlling device as a whole. In FIG. 18 the plate 212 and the membrane 214 are shown with dot-and-dash line in their most protruding position, i.e. the opening of the outlet 203 is minimal.

The problem with such throttlings is usually that they clog easily on account of solid or viscous impurities in the flow of liquid. However, such a clogging will cause a decrease of the pressure at the periphery of the second vortex chamber 210, while the chamber is being emptied. This results in a decrease of the force, with which the plate 212 is advanced, for which reason the spring 219 will draw the plate back and let impurities pass. The pressure at the periphery of the second vortex chamber 210 will then increase again and the plate 212 will be advanced once more.

In FIG. 10 an embodiment with a circular disc 312 is shown, said disc following with a small interspace the inner surface of the second vortex chamber. The disc 312 is at its centre suspended in a bearing 313, through which the disc may be influenced in an upwards direction by means of a spring. Furthermore, a friction disc 314, which brakes the disc 312, is placed at the centre of the disc 312 between the disc and the inner surface of the second vortex chamber. When the second vortex chamber 310 during operation gets filled up, the liquid in the chamber will close the slot between the disc 312 and the inner surface of the vortex chamber 310 at the periphery of the disc 312, a closed air pocket being created at the upper surface of the disc 312. The pressure in this air pocket will then be the same as the pressure in the liquid at the periphery of the disc 312. When the pressure at the inlet 304 to the first vortex chamber 301 is increased, the vortex in this chamber gets bigger, the jet of the in-flowing liquid is contracted and accelerated to a higher degree before running tangentially into the second vortex chamber 310, which increases the rotation of the liquid in this vortex chamber. This causes an increase of the pressure at the periphery of the second vortex chamber 310 on account of the centrifugal forces, the pressure below the disc 312 at its centre decreasing simultaneously to the pressure at the outlet 311. This brings about a pressure difference at the centre of the disc 312, which pressure difference forces the disc 312 downwards against the force of the spring in the bearing 313. Thereby the disc 312 is released from the friction disc, and the disc 312 can now follow, instead of braking, the rotation of the liquid in the second vortex chamber 310. Thereby the braking effect of the flow controlling device is improved at heavy loads.

While the embodiment shown in FIGS. 5 and 6 is suited for being built in either at the inlet or the outlet of a pipe system, and the embodiments shown in FIGS. 7-10 are adapted for being mounted at the outlet of a pipe mouthing in a well, the embodiment shown in FIGS. 11 and 12 is like the embodiment shown in FIGS. 3 and 4 adapted for being mounted in the drain from a structure, the former possibly connected to a pipe system.

The embodiment shown in FIGS. 11 and 12 thus comprises an essentially circular, disc-shaped, first vortex chamber 401 with a tangential inlet 402 and an disc-shaped second vortex chamber 410 with a central outlet 411. In the first vortex chamber 401 inner, peripheral wall parts 405,406 are positioned on a circular plate 407, which can be turned by means of a handle 408. Thereby the inner peripheral walls 405,406 can be displaced, and the openings of the inlet 402 and the outlet 403 of the first vortex chamber 401 can be regulated. Due to the fact that this flow controlling device normally has its outlet 411 above the level of the inlet 402, it will be immersed and consequently extend into the liquid to be conveyed and perhaps braked by means of the controlling device. This immersed state results, as explained in connection with FIG. 4, in a contraction of the in-flowing liquid in the inlet 402, the effect of the controlling device being enhanced.

In the embodiment shown in FIG. 13 two first vortex chambers 501a and 501b are placed one after the other. A protrusion 504 in the inlet of the first of these two chambers 501a gives a flow pattern as shown with arrows in FIG. 15, with a vortex around an axis A in the vortex chamber 501a and a vortex around an axis B in the vortex chamber 501b.

By this embodiment a flow controlling device is obtained, in which a small flow will flow unimpededly from the inlet 502 to the outlet 511 of a second vortex chamber 510. Due to the protrusion 504 a vortex will in case of stronger currents arise with the axis A in one 501a of the two first vortex chambers, whereby in the outlet 503 from the first vortex chambers a sufficiently contracted and accelerated jet will form with a sufficiently big component in the tangential direction of the second vortex chamber 510 for attaining the desired braking effect in this second vortex chamber.

I claim:

1. A flow controlling device for a discharge system, such as a drainage system, comprising a first vortex chamber (101, 201, 301, 401, 501) with an inlet (102, 202, 302, 402, 502) and an outlet (103, 203, 303, 403, 503) and a second bigger vortex chamber (110, 210, 310, 410, 510) with a peripheral inlet and a central outlet axial in relation to a vortex in this chamber, said second vortex chamber being at the peripheral inlet connected to the outlet (103, 203, 303, 403, 503) of the first vortex chamber (101, 201, 301, 401, 501b), wherein the first vortex chamber (101, 201, 301, 401, 501) is symmetrical with respect to a median plane perpendicular to a vortex axis (A), the direction of both the inlet (101, 201, 301, 401, 501) and the outlet (103, 203, 303, 403, 503) being parallel with said median plane, the first vortex chamber being asymmetric with respect to a plane parallel with the inlet direction and perpendicular to said median plane, the vortex axis (A) of the first vortex chamber (101, 201, 301, 401, 501) being perpendicular to a tangent of the second vortex chamber (110, 210, 310, 410, 510) at the peripheral inlet and the ratio between the diameters of the first vortex chamber and the second vortex chamber is less than 0.43:1.

2. A flow controlling device according to claim 1, wherein the first vortex chamber (101, 201, 401) is a disc-shaped hollow space, and that the inlet (102, 202, 402) of this vortex chamber is tangential.

3. A flow controlling device according to claim 2, wherein the disc-shaped first vortex chamber (401) has an inner (405, 406) and an outer peripheral wall, the inner peripheral wall (405, 406) being displaceably in such a way along the outer peripheral wall that a size of the opening of the inlet (402) and/or the outlet (403) is changed.

4. A flow controlling device according to claim 1, wherein the first vortex chamber (501a) is disc-shaped, the inlet (502) and the outlet (503), being positioned on a common axis, and in the inlet at one side of a plane through the inlet and the outlet and perpendicular to the plane of the disc a protrusion (504) is provided 5. A flow controlling device according to claim 4, wherein more than one of the first vortex chamber are mounted in series with parallel vortex axes (A, B).

6. A flow controlling device according to claim 1, wherein the inlet of the first vortex chamber (1, 401) comprises a connecting piece adapted to extend into a hollow space, from which liquid during operation flows into the flow controlling device.

7. A flow controlling device according to claim 1, wherein in the flow path between the first (201) and the second vortex chamber (210) a slide valve (212) is provided, said slide valve being activated by a spring (219) towards an open position and towards a closed position by a member (213), which is in turn activated by a displaceable wall (214) in a chamber (216), which is flow-connected with the second vortex chamber (210) close to its periphery.

8. A flow controlling device according to claim 1, wherein the second vortex chamber (310) is essentially circular and disc-shaped and positioned in such a way that the disc-shape is horizontal, wherein on the innerside of the upper side wall of the second vortex chamber (310) a circular disc (312) is provided, which disc with a small interspace follows said side wall and at its centre is suspended for horizontal rotation and by means of a spring (313) activated upwards to brake (314) against said rotation.

* * * * *